June 27, 1950     D. FLOWERS     2,512,635
TOW BAR
Filed April 15, 1947
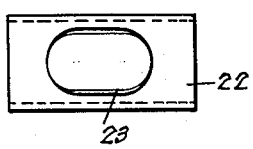
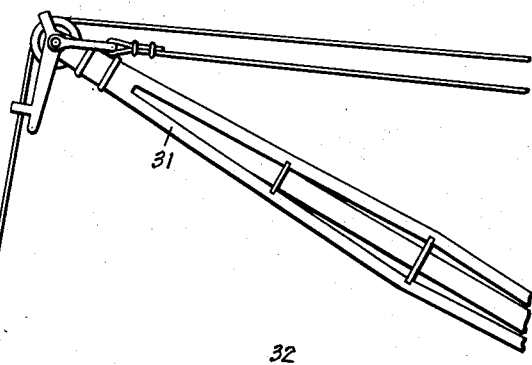
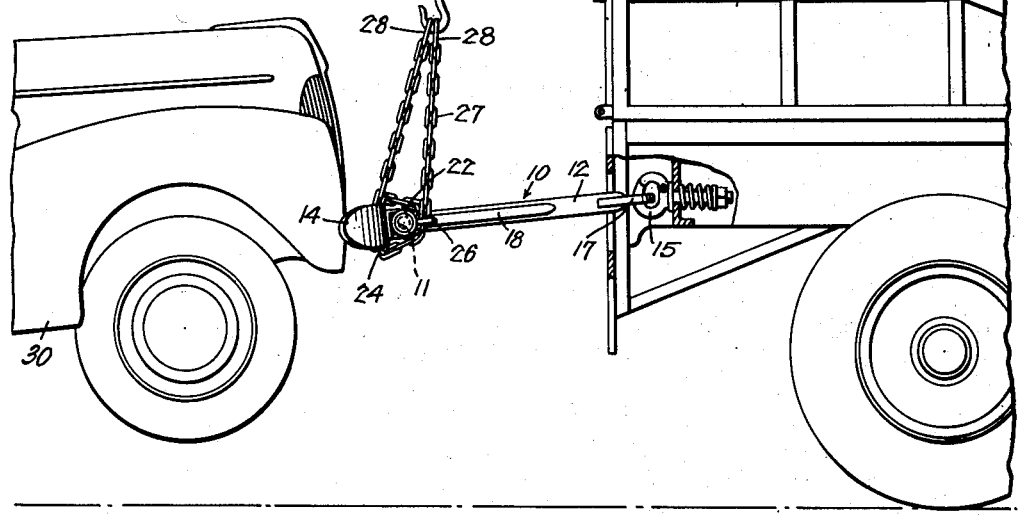
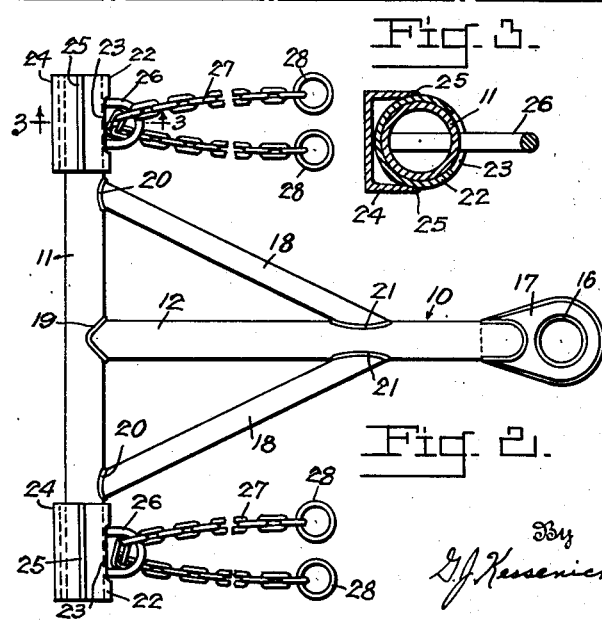
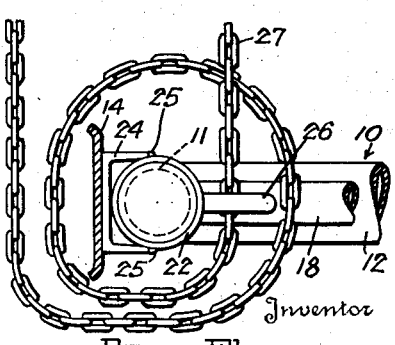
Inventor
Dave Flowers Patented June 27, 1950

2,512,635

UNITED STATES PATENT OFFICE 2,512,635

TOW BAR

Dave Flowers, Laurel, Miss.

Application April 15, 1947, Serial No. 741,663

10 Claims. (Cl. 280—33.14)

(Granted under the act of March 3, 1883, as amended April 30, 1928; 370 O. G. 757)

The invention described herein may be manufactured and used by or for the Government for governmental purposes without the payment of any royalty thereon.

This invention relates generally to tow bars for towingly connecting vehicles, and it relates particularly to an improved tow bar of the type particularly suitable for connecting a vehicle to be towed, for example a motor vehicle, to a towing vehicle which may be of the type generally known as a wrecker, the latter being equipped with a hoisting boom for towing purposes whereby the leading wheels of the towed vehicle are off the ground and no driver is required for the towed vehicle.

It is an object of my invention to provide an improved tow bar of the above type which permits a vehicle to be towed either from its front or rear and which holds the towed vehicle at a constant distance from the towing vehicle.

It is a further object of my invention to provide an improved tow bar of the above type which will prevent damage to either the towing or towed vehicle during and as a result of the towing operation while permitting short turning radius, no driver being required for the towed vehicle which has its leading wheels off the ground during the towing operation.

It is a further object of my invention to provide an improved tow bar of the above type which is of relatively simple and inexpensive construction, and which is easily and quickly attached and detached, the tow bar being generally of T-shape.

The specific nature of my invention as well as other objects and advantages thereof will be apparent from a description of a preferred embodiment as shown in the accompanying drawing, in which similar characters of reference indicate similar parts throughout the several views.

In the drawings:

Fig. 1 is an elevational view of my improved tow bar, showing the same connected at the rear of a towing vehicle, partly in section, and at the front of a towed vehicle.

Fig. 2 is a plan view of my improved tow bar including hoist chains.

Fig. 3 is a sectional view taken on a plane indicated by the line 3—3 of Fig. 2.

Fig. 4 is an enlarged plan view of one of the sleeves detached from an extremity of the cross bar portion of my improved tow bar.

Fig. 5 is a fragmentary elevational view of my improved tow bar and illustrating more or less diagrammatically the method of attaching the same with one of the hoist chains to a bumper of a vehicle to be towed.

Referring now particularly to the drawings, my improved tow bar 10 is shown in Fig. 1 towingly connected adjacent the cross bar portion 11 thereof to a bumper 14 on the leading portion of the vehicle 30 to be towed and to the hoist boom 31 of the towing vehicle 32, tow bar 10 being further connected adjacent the opposite end thereof to suitable attaching means 15 such as towing hook or pintle on the towing vehicle. As further shown in Fig. 1 the leading wheels of the vehicle to be towed are preferably off the ground, being maintained in elevated position during the towing operation by means of the hoist boom connected as above described.

Tow bar 10, more clearly illustrated in Figs. 2 to 4, comprising stem 12, cross bar 11 and braces 18, is constructed chiefly of steel pipe or tubing, although it is to be understood that other suitable material having the necessary structural properties for the purpose may be utilized in addition to or in place of steel pipe or tubing. Stem 12 of tow bar 10 has an eye 16 at the lead end thereof for attachment to the pintle or other attaching means carried by the towing vehicle, and in the particular embodiment illustrated eye 16 is constructed in a separate eye portion 17 which is welded to the lead end of stem 12 in order to provide an eye of sufficiently large diameter. The opposite end of stem 12 is welded centrally at right angles to a cross bar 11 at point 19 to form a rigid body portion of general T-shape. Extending from the arms of cross car 11 to stem 12 are a pair of diagonal braces 18 each of which is welded at one end to cross bar 11 at a point 20 on one of the arms thereof between its extremity and point 19, and at the other end to stem 12 intermediate the ends thereof at a point 21.

The two extremities of cross bar 11 each carry a close fitting, floating sleeve 22 having a slot 23 therein. Opposite slot 23 a channel member 24 having the same length as sleeve 22 and the same width as the outside diameter of sleeve 22 is welded to the latter at the points of contact 25 between the flanges of the channel member and the sleeve. Adjacent each extremity of cross bar 11 an eye member 26 is welded thereto so as to protrude forward through slot 23 of sleeve 22 with sufficient tolerance to permit a 25 degree rotation of sleeve 22 on cross bar 11. Eye members 26 thus maintain sleeves 22 in proper position for taking compression shocks from the bumper of the towed vehicle, and the entire arrangement of a sleeve 22 with its respective channel member 24 and eye member 26 on cross bar 11 may be properly designated as a sleeve bumper.

Another purpose of eye member 26 is to serve as carriers and guides for close link chains 27. Chains 27 are used to bind tow bar 10 to the bumper of the towed vehicle, and also to support the elevated end of the towed vehicle by attaching the ends of chains 27 to the hoisting hook or hooks from the boom of the wrecker or towing vehicle. Large terminal links 28 on the ends of each of chains 27 prevent its escape through its respective eye member 26 and also provide links of adequate space for attachment thereof to the hoisting hook. As illustrated in Fig. 5, binding of the tow bar to the bumper is made rigid by throwing an extra turn of chain around cross bar 11 and the bumper of the vehicle to be towed. Both ends of each chain are then attached by large terminal links 28 to a hoisting hook from the boom of the towing vehicle or wrecker, the tension of hoisting being sufficient to prevent any play thereafter. While tow bar 10 has been described with respect to attachability to a bumper of the vehicle to be towed, it is to be understood that the advantages of my improved tow bar are inherent if attached to the frame or other suitable part of the vehicle to be towed.

The dimensions of my improved tow bar depend, of course, upon the load for which it is to be used. For example, for my improved tow bar to perform satisfactorily for towing from front or rear of towed vehicle under all conditions on all vehicles to be towed and which are capable of being handled by a four ton wrecker or towing vehicle, the following dimensions are given merely by way of illustration: Stem 12 and cross bar 11 may be constructed of 2 inch standard pipe, with hole or eye 16 having a diameter of 3 inches; braces 18, about 20 inches in length, may be constructed of 1 inch standard pipe; the overall length of tow bar 10 may be 34½ inches, with a width of 32½ inches taken between ends of cross bar 11; sleeves 22 each have a length of about 6 inches with slot 23 therein being about 3¼ inches in length and 1½ inches in width; eye members 26 may be constructed of ½ inch material with an eye opening of ⅞ inch radius to accommodate ⅜ inch close link chain 27 having large end links 28. For use with all loads capable of being handled by a ten ton wrecker or towing vehicle for example, an increase in the above dimensions and in the weight of the tow bar will be necessary.

Some of the advantages of my improved tow bar may be summarized:

Rotation of sleeves 22 on cross bar 11 during the towing operation permits tow bar changes of angle without binding, strain or friction, and with the pivoting action obtained through eye 16 about the attaching means or pintle on the towing vehicle universal movement is obtained, tow bar 10 thus providing universal attachment. The towed vehicle, requiring no driver, handles like a semi-trailer. My improved tow bar provides ease of attachment and detachment; it can be attached by one man to either the front or rear of the vehicle to be towed, and attachment can be made without hindrance by the position of the vehicle to be towed. My improved tow bar holds the towed vehicle at a constant distance from the towing vehicle, yet permits short turning radius without damage to either vehicle, including damage to fenders, lamps or radiator of the towed vehicle, and it prevents shock to both vehicles by the elimination of slack in the tow linkage while the leading wheels of the towed vehicle are off the ground. It provides greater control over the towed vehicle when it is being towed on hills, and it provides greater control while stopping, turning or backing in comparison with prior towing devices; it eliminates the danger of "jack-knifing," and when connected it is impossible to become disconnected through shocks occasioned by towing on rough roads. My improved tow bar is simple and inexpensive to produce, and it can be manufactured by one welder employing a welding torch and grinder.

Various changes may be made in the particular embodiment of my invention without departing from the spirit thereof, or from the scope of the appended claims.

I claim:

1. A tow bar comprising a leading stem member rigidly secured substantially at right angles at one end thereof to a cross member at a point substantially centrally of the length of the latter and forming thereof a pair of oppositely extending arms, a pair of rigid brace members extending diagonally from said stem member to said arms, each of said brace members being rigidly secured at one end thereof to said stem member and being rigidly secured at its other end to a respective one of said arms, rotatable sleeve members rotatably mounted on said arms and adapted to contact a vehicle to be towed and tow connecting means carried by said arms adjacent said sleeve members for holding the latter in rigid towing contact with a vehicle to be towed.

2. A tow bar comprising a leading stem member rigidly secured substantially at right angles at one end thereof to a cross member at a point substantially centrally of the length of the latter and forming thereof a pair of oppositely extending arms, a pair of rigid brace members extending diagonally from said stem member to said arms, each of said brace members being rigidly secured at one end thereof to said stem member and being rigidly secured at its other end to a respective one of said arms, a rotatable sleeve member rotatably mounted on each of said arms, means to limit rotation of said sleeve member, and tow connecting means carried by each of said arms adjacent said sleeve member for binding the latter to a vehicle to be towed.

3. A tow bar as set forth in claim 2 wherein said means to limit rotation of said sleeve member includes an element secured to said arm beneath said sleeve member and extending outwardly therefrom through a slot of predetermined width in said sleeve member.

4. A tow bar comprising a leading stem member rigidly secured substantially at right angles at one end thereof to a cross member at a point substantially centrally of the length of the latter and forming thereof a pair of oppositely extending arms, a sleeve member rotatably mounted on each of said arms, a slot of predetermined width in said sleeve member, an eye member secured to said arm beneath said sleeve member and protruding outwardly therefrom through said slot of predetermined width thereby providing predetermined limited rotation of said sleeve member, and means carried by said eye member in the outwardly protruding portion thereof for attaching said tow bar to a vehicle to be towed.

5. A tow bar as set forth in claim 4 wherein said means carried by said eye member in the outwardly protruding portion thereof comprises a chain slidable through said eye member and of sufficient length to provide an extra turn thereof about said tow bar and that part of the vehicle to be towed to which said tow bar may be attached.

6. A tow bar as set forth in claim 5 wherein said chain has terminal links on the ends thereof of a size sufficient to prevent escape of said chain from said eye member, said terminal links further being of a size sufficient to provide adequate space therein for attachment to a hoist hook from a boom of the towing vehicle.

7. A tow bar for towingly connecting a vehicle to be towed to a towing vehicle having a hoist boom, said tow bar comprising a leading stem member rigidly secured substantially at right angles at one end thereof to a cross member at a point substantially centrally of the length of the latter, an eye carried adjacent the opposite end of said stem for pivotal attachment to a pintle on said towing vehicle, a sleeve bumper including a sleeve rotatably mounted on said cross member adjacent each end thereof, a slot of predetermined width in said sleeve, an eye member secured to the leading side of said cross member beneath said sleeve and protruding outwardly therefrom through said slot in said sleeve, a chain carried by said eye member in the outwardly protruding portion thereof and of sufficient length to bind said tow bar to a leading bumper of said vehicle to be towed, said chain being adapted to be connected to a hoisting hook from said hoist boom of the towing vehicle.

8. In combination with a tow bar having a leading stem member attachable at one end thereof to a towing vehicle and rigidly secured at right angles at the other end thereof to a cross member at a point centrally of the length of the latter to form thereof a pair of oppositely extending arms, a pair of rigid brace members extending diagonally from said stem member to said arms, each of said brace members being rigidly secured at one end thereof to said stem member and being rigidly secured at its other end to a respective one of said arms, a rotatable sleeve member rotatably mounted on each of said arms, means on each of said arms to limit rotation of said sleeve member, and means carried by each of said arms adjacent each said sleeve member for towingly attaching said tow bar to a vehicle to be towed and to the hoisting boom of a towing vehicle.

9. The combination as set forth in claim 8 in which said means on said arms to limit rotation of said sleeve member comprises an eye member secured to said arm beneath said sleeve member and extending outwardly from the latter through a slot therein of predetermined width.

10. The combination as set forth in claim 9, in which said means adjacent each said sleeve member for towingly attaching said tow bar comprises a chain carried by said eye member in the outwardly extending portion of the latter.

DAVE FLOWERS.

REFERENCES CITED

The following references are of record in the file of this patent:

UNITED STATES PATENTS

| Number | Name | Date |
|---|---|---|
| Re. 14,720 | Holmes | Sept. 2, 1919 |
| 1,296,105 | Navratil | Mar. 4, 1919 |
| 1,537,249 | Manley | May 12, 1925 |
| 1,591,201 | Wotzka | July 6, 1926 |
| 1,678,114 | Gustafson | July 24, 1928 |
| 2,002,416 | Shafer | May 21, 1935 |